H. CRANMER.
ROUTE INDICATOR.
APPLICATION FILED APR. 7, 1916.

1,246,240.

Patented Nov. 13, 1917.
3 SHEETS—SHEET 1.

WITNESS
C. P. Ellis

INVENTOR
H. Cranmer
BY
John M. Spellman
ATTORNEY

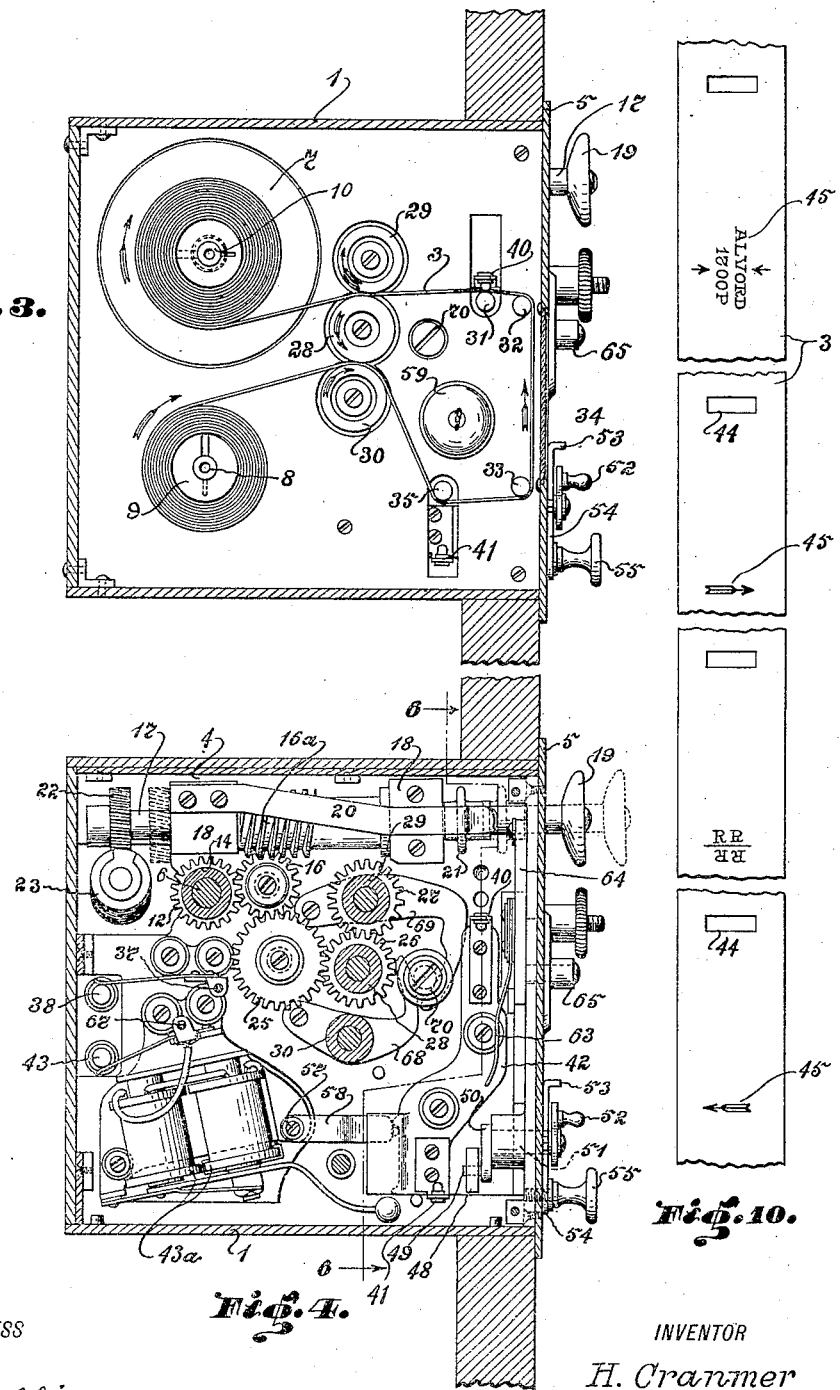

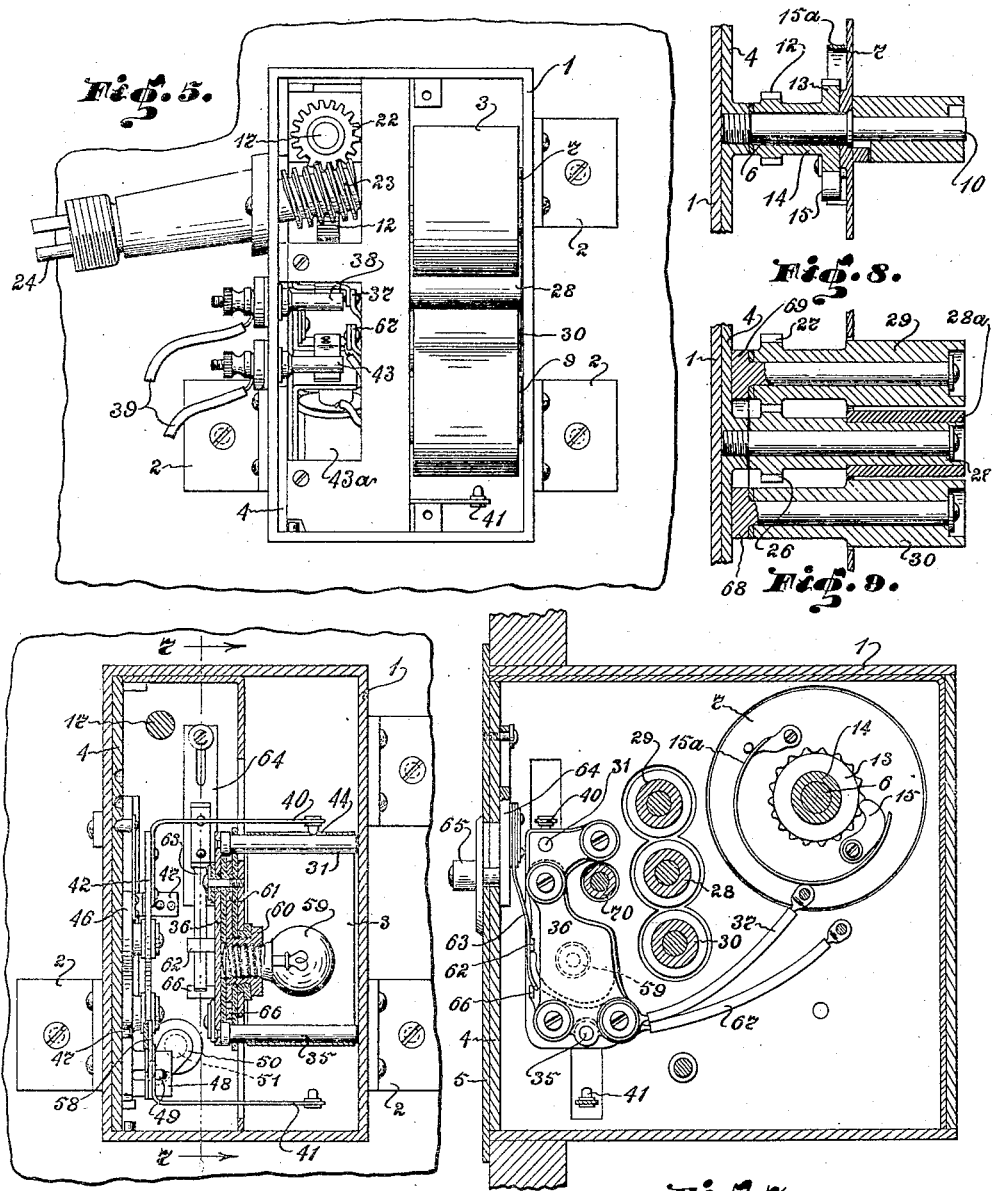

UNITED STATES PATENT OFFICE.

HOWARD CRANMER, OF WICHITA FALLS, TEXAS.

ROUTE-INDICATOR.

1,246,240.  Specification of Letters Patent.  Patented Nov. 13, 1917.

Application filed April 7, 1916. Serial No. 89,564.

*To all whom it may concern:*

Be it known that I, HOWARD CRANMER, citizen of the United States, residing at Wichita Falls, in the county of Wichita and State of Texas, have invented certain new and useful Improvements in Route-Indicators, of which the following is a specification.

My invention has relation to a route indicator for automobiles or the like and in such connection it relates broadly to the provisions of means whereby the tape, ribbon or band constituting a road map or indicator may from time to time operate an audible signaling device to give notice to the driver of approaching deviation or danger in the road.

In traveling over strange roads it is of the utmost importance, particularly at night, that the turns, bends, crossings and other hazards and dangers of the road shall be known to the driver some time before the danger or hazard is to be met. In some forms of route indicator a panoramic representation of the road either in stationary or rotary form is spread out before the driver. However, such indicators are valueless without the careful and close scrutiny of the driver. Again as such panoramic guides are usually of small size the signals or arbitrary signs distinguishing the hazards are so small and indistinct as to be confusing to the driver, especially at night.

It is one of the main objects of my present invention to provide a road map or indicator which not only visibly indicates the characteristics and risks of the road which it depicts but is also provided with a means for operating at required intervals an audible signal to call attention to approaching hazards or dangers.

Another of the main objects of my present invention is to provide means of simple yet accurate construction whereby a traveling apron band, tape or the like shall actuate an audible alarm at times required.

In the carrying out of my invention there is provided first,—a tape, band or apron having on its face an indication or depiction of the topography of the road and on its body a series of apertures or openings so arranged as to control the operation of an audible signal to call the attention of the driver of the vehicle to an approaching hazard or danger in the road; and second, there is provided in conjunction with the band or tape a means for turning the same at a speed corresponding with the speed of travel of the vehicle and a means for establishing through the apertures an electric circuit in which a bell, buzzer or other audible signal is included so as to be operated when the circuit is established.

The nature and scope of my invention will be more fully understood from the following description taken in connection with the accompanying drawings forming part hereof, in which—

Fig. 3, is a side elevational view partly sectioned.

Fig. 4, is a longitudinal sectional view of the device.

Fig. 5, is a rear view with the cover plate removed.

Fig. 6, is a cross sectional view taken on the line 6—6 of Fig. 4.

Fig. 7, is a longitudinal sectional view taken on the line 7—7 of Fig. 6.

Fig. 8, is a detail view in section of the driven spool or drum.

Fig. 9, is a detail view in section of the guide rollers for the tape, and

Fig. 10, is a face view of the tape.

Figure 1:
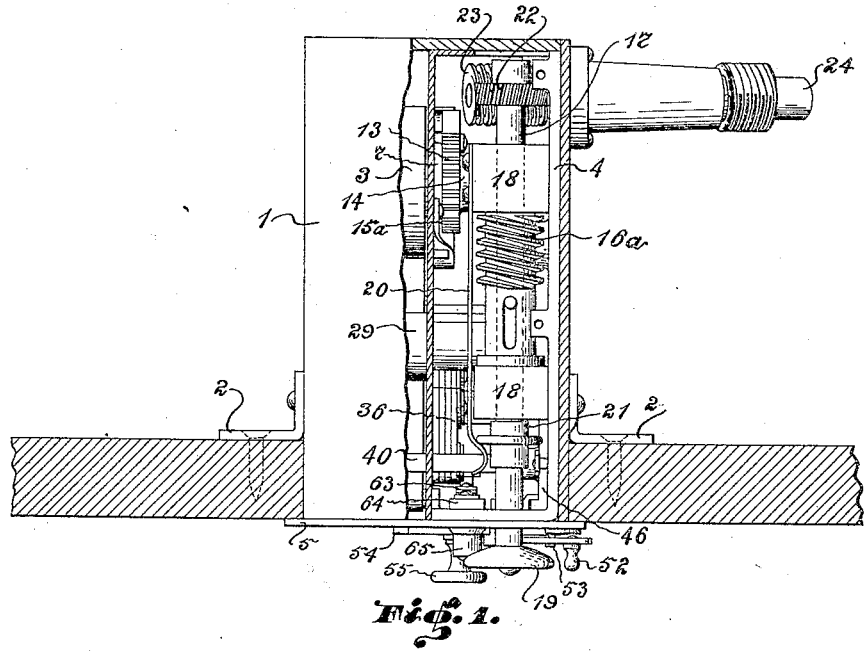
Figure 1, is a top or plan view of a device embodying the main features of my invention, the top or cover of the device being partly removed.
Figure 2:
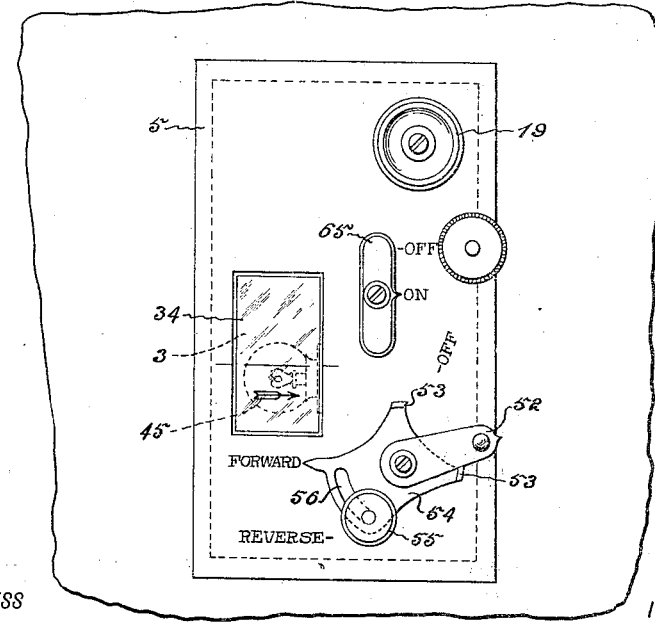
Fig. 2, is a front elevational view thereof.

Referring to the drawings, 1 represents a casing of required box shape and adapted to be secured through ears 2 to the dash board of the vehicle. Within the box or casing 1 is located the various mechanisms for driving the tape 3, reversing the movement of said tape when required, rendering the driving mechanism inoperative, the alarm operating means and the illuminating means together with the means for rendering the alarm operating and illuminating means inoperative.

All these mechanisms are carried by frame work consisting essentially of a plate 4 and such additional standards, partitions, etc., as are required, especially such parts as will be hereinafter described.

The plate 4 is connected to the front or cover 5 of the box in such manner that when the cover 5 is removed from the box, the plate 4 and mechanisms supported thereby may be withdrawn for adjustment or repairs if required or for changing one tape 3 for another according to the road to be traveled.

The tape 3 is formed of a preferably translucent material, non-conductive of electricity, such as stout paper, fabric or the like and one end is wound up on a reel and arranged to slip over the spindle 6 of a spool 7. The other end of the tape 3 is adapted to be wound up on a reel and arranged to slip over the spindle or axis 8. The reel 7 which is driven and the reel 9 which is preferably idle, turn loosely upon pins 10 and axis 8, supported by and projecting from the plate 4. The driven spool 7 is provided with a take up mechanism comprising a pinion 12 and ratchet 13 rigidly connected together by a sleeve 14 and the ratchet wheel 13 is loose on the axis 6. A pawl 15 with its spring 15$^a$ engages ratchet wheel 13 to permit the wheel and spool 7 to turn slightly while being positively driven to compensate for varying diameters of the spool as the tape is wound up.

The pinion 12 gears or meshes with a gear 16 which is in mesh normally with the worm gear 16$^a$ of a shaft 17. The shaft 17 has, however, an axial movement in its bearings 18 and in the gear 16$^a$ and its front end projects through the cover 5 in the form of a knob 19. A spring 20 coöperating with a flange or collar 21 of the shaft 17 serves to lock the shaft temporarily in its in and out longitudinal or axial movement, without, however, preventing the rotation of said shaft. When the shaft 17 is pressed inward, a gear or pinion 22 at or near its inner end is brought into mesh with a worm gear 23 formed on a power transmitting shaft or shaft coupling 24. Where the shaft 17 is to be driven from a speedometer for instance the part 24 is a shaft coupling in that it connects through suitable means the speedometer (not shown) with the shaft 17. If the shaft 17 is to be driven directly from moving parts of the engine or vehicle then the part 24 is a power transmitting device connecting the shaft 17 with the moving part or parts. When the shaft 17 is drawn outward the pinion 22 is disconnected from the part 24 and movement of shaft 17 is controlled by the knob 19 in the setting or resetting of the drum or spool 7 and tape 3 carried thereon. The gear 16 with which pinion 12 and worm gear 16$^a$ are in mesh is also in mesh with one of a chain of gears 25, 26 and 27 designed to control the revolution of the two upright driven rollers 28 and 29 and an idle or tensioning roller 30. Thus gear 25 transmits motion from gear 16 to a pinion 26 locked to the upright roller 28 and pinion 26 meshes with pinion 27 locked to upright roller 29. The upright roller 28 is arranged between rollers 29 and 30 (see Fig. 9) and has its surface preferably covered with rubber 28$^a$ or other suitable friction material. The tape 3 when wound upon spool 7 passes between rollers 28 and 29 and from thence over a contact post 31, and over the two guides 32 and 33 arranged adjacent to an opening 34 in face plate or cover 5. The tape 3 then passes around a second contact post 35 and between rollers 28 and 30 and thence to spool 9. The contact posts 31 and 35 are of metal and project upward from a plate 36 properly insulated from surrounding parts and plate 36 is connected by wire 37 (see Fig. 7) with one binding post 38 of an electric circuit 39 (see Fig. 4).

The contact post 31 coöperates with a contact spring 40 during travel in one direction along the road and contact post 35 coöperates with a second contact spring 41 during travel in the reverse direction along the said road. The two contact springs 40 and 41 both project upward from a common plate 42 arranged to be shifted back and forth by appropriate mechanism (a specific form of which will be hereinafter described) so that in one movement of the plate 42 the contact spring 40 is brought into operative position with contact post 31 while contact spring 41 is brought out of operative position with the post 35 and in an opposite movement of plate 42 a reverse condition of operative and inoperative contacts is obtained. The plate 42 is included in that part of the circuit leading from binding post 43 through a buzzer 43$^a$ preferably located within the box 1 or through an audible alarm inside or outside the box, and the plate 36 completes the circuit when a contact spring 40 or 41 makes contact with a contact post 31 or 35. The tape 3 which travels over the posts 31 and 35, being of insulating material, would ordinarily prevent contact between contact spring 40 and post 31 during the movement of the tape. To permit of contact at predetermined points in the tape and thus operate the audible signal at times required by the exigencies of the road, the tape is provided with apertures or openings 44 (see Figs. 10 and 6) through which the contact spring may project into contact with the post.

A preferred means for shifting the plate 42 carrying the springs 40 and 41 is shown in the drawings. It consists essentially in supporting the plate 42 on a slide 46 working in a guide or guides 47 on plate 4. To the slide 46 is secured a slotted plate 48, in the slot of which a crank pin 49 works. The crank pin 49 projects from the crank 50 of a crank shaft 51. The crank shaft 51 traverses the front or cover 5 and is provided with a lever or handle 52. Ordinarily the movement of slide 46 causes one of the contact springs 40 or 41 to move into and out of operative engagement with the corresponding contact post 31 or 35. To gage this movement of the slide the handle 52 operates between two stops or projections 53 carried by bracket 54 pivoted on shaft 51 which through screw 55 passing through a slot 56 of bracket 54 may be adjustably secured to cover 5. When, however, the tape is used to indicate a return route, the pins or stops 53 are adjusted to permit of the proper movement of the slide under the new conditions. This is accomplished by unloosening the screw 55 and turning the bracket 54 to the required position. The cover 5 has marks to indicate the required position of stop bracket 54.

The plate 42 maintains electrical contact with one pole 57 of the buzzer or electric alarm 43$^a$ during its shifting operations by preferably the means disclosed in the drawings, namely—the pole 57 of buzzer 43$^a$ is extended in the form of a contact spring 58 normally pressing upward in contact with the under surface of the plate 42.

For night use, a small electric lamp 59 is installed to the rear of the tape 3 as it passes over the window or opening 34 of the cover plate 5. Any means for conducting current from the two binding posts 38 and 43 to and through the lamp 59 may be devised, and any means for making and breaking the circuit through the lamp would be within the scope of my invention. For the sake of illustration the drawings show the lamp 59 screwed into a metallic socket 60 connected to a plate 61 having a contact piece 62 and its base fits against the plate 36. A contact spring 63 carried by a slide 64 and button 65 serves to make or break contact between plates 61 and 36 by sliding over or away from the piece 62 and a piece 66 leading by wire 67 to the binding post 43.

To permit of the easy removal and replacement of tape 3 between central roller 28 and the rollers 29 and 30, these outside rollers 29 and 30 are each supported by levers 68 and 69 pivoted at one end to the bed plate 4 so that the rollers 29 and 30 may be swung toward or away from the central roller 28. A screw post 70 serves to clamp or lock the free ends of levers 68 and 69 when rollers 29 and 30 are properly adjusted.

When a return trip of the road or travel in a reverse direction is to be indicated by tape 3, the reel of tape on spool 7 and the reel of tape on spool 9 are removed and tape turned over with the two reels placed on respectively spool 9 and spool 7. In other words after the tape is turned over the wound up portion of the tape is placed on idle spool 9 and the unwound portion on driven spool 7.

Having thus described the nature and objects of my invention what I claim as new and desire to secure by Letters Patent, is—

1. In a device of the character described, the combination of a driven reel and an idle reel, a tape arranged to be wound upon the driven reel and unwound from the idle reel, two friction rollers geared together and positively driven, between which rollers the tape is arranged to pass, an idle friction roller adjacent to one of said driven friction rollers between which and said driven friction roller the tape is arranged to pass and two contact posts over which the tape is moved in its passage from the two driven friction rollers to the driven and idle friction rollers.

2. In a device of the character described, a driven reel controlling the movement of the tape and means for positively actuating said reel, in combination with a resetting device comprising a shaft arranged to be drawn outwardly and pushed inwardly of the device, a pinion and worm gear on said shaft adapted to mesh with the actuating mechanism for the reel when said shaft is pushed inward, a pinion on said reel and a second pinion in gear therewith, said second pinion adapted to mesh with the worm gear on said shaft when the shaft is drawn outward to disengage the pinion and worm gears from the actuating mechanism for the reel, and means on the shaft for permitting of the manual shifting in and out of said shaft.

3. In a device of the character described, a driven reel, a spindle carrying said reel, a ratchet wheel loose on said spindle, a pinion rigidly connected with the ratchet wheel, said pinion being in mesh with the means for driving the reel, a pawl pivoted to the reel and engaging the teeth of the ratchet wheel and a spring locked to the reel and arranged to yieldingly press said pawl against the teeth of said ratchet wheel.

4. In a device of the character described, a positively actuated tape, two contact posts over which the tape is moved, two contact springs, a common plate from which said springs project and means for shifting said plate to bring either of said springs in contact with its respective contact post.

In testimony whereof I have signed my name to this specification.

HOWARD CRANMER.

Copies of this patent may be obtained for five cents each, by addressing the "Commissioner of Patents, Washington, D. C."